(12) United States Patent
Pastilha

(10) Patent No.: US 9,708,029 B2
(45) Date of Patent: Jul. 18, 2017

(54) STEPPER EXERCISE SCOOTER

(71) Applicant: Adelino F. Pastilha, Valhalla, NY (US)

(72) Inventor: Adelino F. Pastilha, Valhalla, NY (US)

( * ) Notice: Subject to any disclaimer, the term of this patent is extended or adjusted under 35 U.S.C. 154(b) by 0 days.

(21) Appl. No.: 14/726,508

(22) Filed: May 30, 2015

(65) Prior Publication Data

US 2015/0344102 A1 Dec. 3, 2015

Related U.S. Application Data

(60) Provisional application No. 62/005,641, filed on May 30, 2014.

(51) Int. Cl.
| | |
|---|---|
| B62M 9/04 | (2006.01) |
| B62M 1/28 | (2013.01) |
| B62K 5/02 | (2013.01) |
| B62K 3/00 | (2006.01) |
| B62K 5/00 | (2013.01) |

(52) U.S. Cl.
CPC .............. *B62M 1/28* (2013.01); *B62K 3/002* (2013.01); *B62K 5/02* (2013.01); *B62M 9/04* (2013.01); *B62K 2005/001* (2013.01)

(58) Field of Classification Search
CPC .. B62M 1/28; B62M 9/04; B62K 5/02; B62K 3/002
See application file for complete search history.

(56) References Cited

U.S. PATENT DOCUMENTS

| | | | |
|---|---|---|---|
| 3,010,553 A | 2/1958 | Van Der Plas | |
| 3,709,341 A | 1/1973 | Schulz | |
| 4,593,799 A | 6/1986 | Ozaki | |
| 5,192,089 A * | 3/1993 | Taylor | B62M 1/28 280/221 |
| 5,368,321 A | 11/1994 | Berman et al. | |
| 6,334,838 B1 | 1/2002 | Lee | |
| 6,402,173 B1 | 6/2002 | Chiu | |
| 6,419,251 B1 * | 7/2002 | Chueh | B62K 3/002 280/220 |

(Continued)

FOREIGN PATENT DOCUMENTS

WO 2006059836 A1 6/2006

OTHER PUBLICATIONS

International Searching Authority, PCT Notification of Transmittal of the International Search Report and the Written Opinion of the International Searching Authority, or the Declaration, Nov. 12, 2015.

*Primary Examiner* — Kevin Hurley
*Assistant Examiner* — Marlon A Arce
(74) *Attorney, Agent, or Firm* — Erickson Law Group, PC

(57) ABSTRACT

A stepper scooter provides step pads that are connected to a laterally arranged rocker bar assembly. Vertical movement of the step pads causes the rocker bar assembly to reciprocally pivot which translates drive chains which cause rotation of the drive wheel or wheels. The rocker bar assembly comprises two four bar linkages between a center fork and each step pad. An alternate embodiment uses the rocker bar to reciprocally rotate a gear axle which drives a bevel gear arrangement to rotate the drive wheel or wheels via one-way bearings. Another embodiment incorporates a chain and sprocket drive between the bevel gear arrangement and the drive wheel or wheels, wherein the one-way bearings are replaced with a one-way sprocket drive.

16 Claims, 8 Drawing Sheets

(56) References Cited

U.S. PATENT DOCUMENTS

| | | |
|---|---|---|
| 6,520,525 B1 | 2/2003 | Yoon |
| 6,588,784 B1 * | 7/2003 | Chen .................. B62K 3/002 |
| | | 280/11.115 |
| 6,648,355 B2 | 11/2003 | Ridenhour |
| 6,716,141 B2 | 4/2004 | Bhoopathy |
| 6,764,088 B2 | 7/2004 | Hung |
| 7,044,488 B1 | 5/2006 | Hamend |
| 7,581,742 B2 | 9/2009 | Chiu et al. |
| 8,556,055 B2 | 10/2013 | Chen |
| 8,579,769 B2 | 11/2013 | Sans |
| 2002/0036388 A1 | 3/2002 | Chueh |
| 2002/0158440 A1 | 10/2002 | Graf |
| 2003/0098566 A1 * | 5/2003 | Christensen .......... B62K 3/002 |
| | | 280/221 |
| 2004/0036249 A1 | 2/2004 | McGuire et al. |
| 2006/0038373 A1 * | 2/2006 | von Detten ............ B62M 1/28 |
| | | 280/221 |
| 2006/0119052 A1 | 6/2006 | Bauce |
| 2009/0091099 A1 | 4/2009 | Pastilha |
| 2010/0001487 A1 | 1/2010 | Pang |
| 2010/0187790 A1 | 7/2010 | Yu |
| 2010/0225085 A1 | 9/2010 | Kim |
| 2010/0320716 A1 | 12/2010 | Sung |

\* cited by examiner

STEPPER EXERCISE SCOOTER

This application claims the benefit of U.S. Provisional Application 62/005,641, filed May 30, 2014.

BACKGROUND

Human powered, step-propelled scooters are known. These scooters generally use an up and down motion from a human's legs to propel the scooter, such as described in U.S. Pat. No. 5,368,321; U.S. Pat. No. 6,334,838; U.S. Pat. No. 6,402,173; U.S. Pat. No. 6,520,525; U.S. Pat. No. 6,648,355; U.S. Pat. No. 6,716,141; U.S. Pat. No. 6,764,088; U.S. Pat. No. 8,579,769; U.S. Pat. No. 7,581,742; US patent application 2006/0119052; US patent application 2010/0225085; US patent application 2004/0036249; US patent application 2010/0001487; and US patent application 2010/00320716. These documents are herein incorporated by reference to the extent not inconsistent with the present disclosure.

The disclosed scooters use a pivoting motion of the pedals to convert the general up and down motion of the user's legs to rotary power at the rear wheel or wheels of the scooter.

The present inventor has recognized that prior art step-propelled scooters are driven by inclined pedals which tend to elongate the scooter and may require an uncomfortable leg motion or posture by the user during operation.

SUMMARY

Exemplary embodiments of the invention provide methods for propelling a stepper machine and improve existing methods for propelling human powered vehicles, such as scooters. Exemplary embodiments of the invention operate in a more comfortable vertical motion than the traditional angle of operation required by other stepping devices.

An exemplary embodiment of the invention provides step pads that are connected to a laterally arranged rocker bar assembly. Vertical movement of the step pads causes the rocker bar assembly to reciprocally pivot which translates drive chains which cause rotation of the drive wheel or wheels.

Advantageously, the rocker bar assembly comprises two rocker bars that are operatively connected in parallel to a center fork and at each end to step pad connectors for the step pads, forming four bar linkages between the center fork and each step pad. This creates a substantially vertical up and down movement of the stepper pads and a more comfortable movement for the user.

An alternate embodiment uses the rocker bar to reciprocally rotate a gear axle which drives a bevel gear arrangement to rotate the drive wheel or wheels via one-way bearings. Another embodiment incorporates a chain and sprocket drive between the bevel gear arrangement and the drive wheel or wheels, wherein the one-way bearings are replaced with a one-way sprocket drive.

Numerous other advantages and features of the present invention will become readily apparent from the following detailed description of the invention and the embodiments thereof, from the claims and from the accompanying drawings.

DETAILED DESCRIPTION

Figure 1:
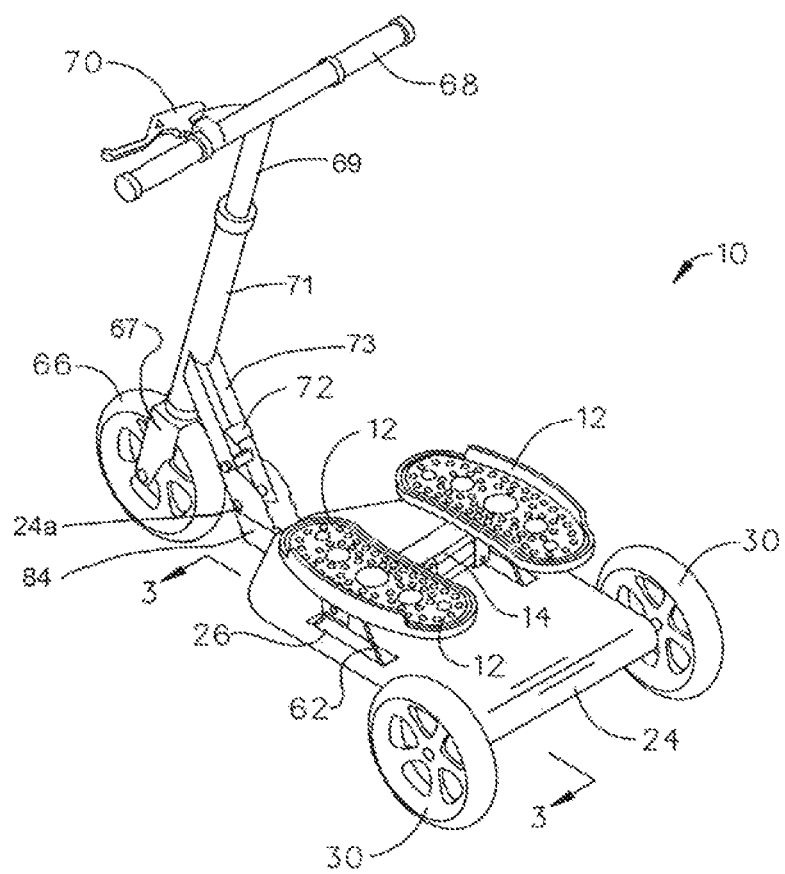
FIG. 1 is a perspective view of an embodiment of a scooter according to the invention.
Figure 2:
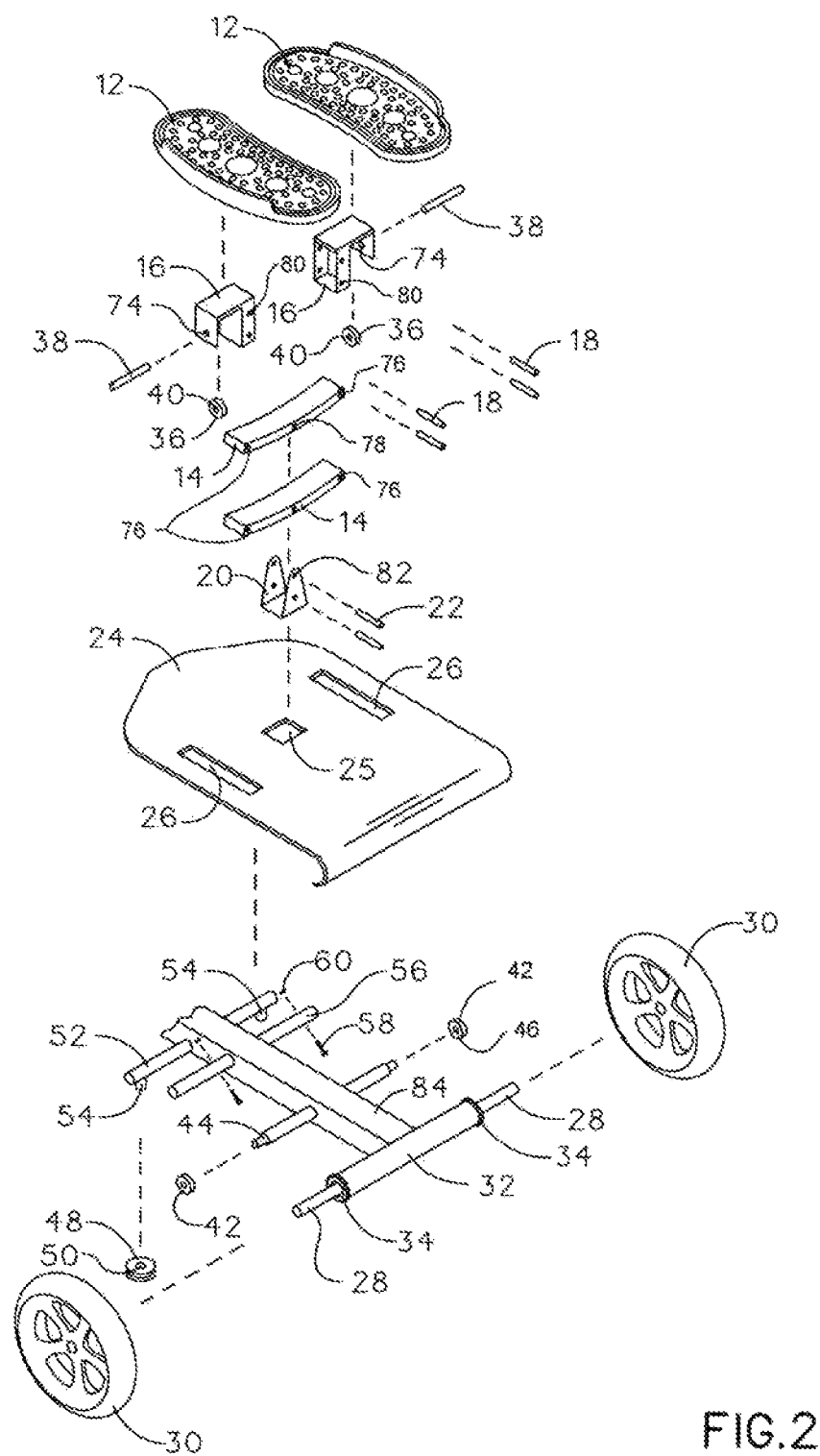
FIG. 2 is a detail exploded view of the scooter of FIG. 1, with some parts removed for clarity.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a step-propelled scooter 10. The scooter includes step pads 12 mounted on rocker bars 14 via step pad connectors 16 and outer rocker pivot rods 18. A center rocker fork 20 mounts the rocker bars 14 via center rocker pivot rods 22. A base plate 24 includes a base plate fork slot 25 for passage of the fork 20 and base plate chain slots 26 for passage of left and right drive chains 62 (described below). A center frame member 84 supports the base plate 24 and is connected to a front angled frame member 73.

As shown in FIGS. 2-6, a rear axle 28 mounts rear wheels 30. A sprocket tube 32 surrounds the rear axle rotatably carries sprockets 34. The sprockets 34 have one direction, freewheeling hubs within the sprocket tube to allow the sprockets 34 to drive the axle 28 in the forward direction and to free wheel in the reverse direction and also to freewheel when coasting, i.e., when the user is not stepping but wants the scooter to continue coasting. One direction, freewheeling hubs are well known for bicycles. Examples of bicycle hubs are disclosed in U.S. Pat. Nos. 4,593,799; 3,010,553; 3,709,341; 8,556,055, herein incorporated by reference to the extent not inconsistent with the present disclosure. The sprocket tube 32 is fixed to the center frame member 84. Center guide wheels 36 are carried on center wheel axles 38 via center guide wheel holes 40 and mounted to the step pad connectors 16. Rear guide wheels 42 are carried on rear guide wheel axles 44 via rear guide wheel holes 46. Horizontal guide wheels 48 having horizontal guide wheel holes 50 are mounted on horizontal wheel rods 52, carried on horizontal wheel posts 54 which extend from the rods 52.

Chain posts 56 receive chain bolts 58 which secure ends of the chains 62 to the posts 56 by chain bolt nuts 60. A cord 64 connects together opposite ends of the chains 62.

A front wheel 66 supports a front of the scooter 10. The front wheel 66 supports a front fork 67 connected to a steering tube 69 which is rotatable within a head tube 71. The steering tube is connected to handlebars 68. A brake 70 is carried by the handlebars 68 and acts on one or more of the wheels in conventional fashion, i.e., urging calipers to pinch a brake disc (not shown). The head tube 71 is mounted to the angled frame member 73. The angled frame member 73 is pivotally attached to the frame member 84 and selectively locked in upright condition as shown in FIG. 1. The frame member 73 includes a folding release handle 72, which when released, allows the angled frame member 73 and head tube 71 to fold down against the base plate 24 about a pin 24a for compact storage or transportation of the scooter.

Center wheel axle holes 74 in the step pad connectors 16 receive the axles 38. Outer pivot rod holes 76 and rocker bar holes 80 receive the pins 18 to pivotally connect the rocker bars 14 to the step pad connectors. Center pivot rod holes 78 and rocker fork holes 82 receive pins 22 to pivotally connect the rocker bars 14 to the rocker fork 20.

The center frame member 84 is connected to the sprocket tube 32 at a rear end and to the angled frame member 73 at a front end, and carries the rods 52, chain posts 56, and rear guide wheel axles 44.

On each side of the scooter the two bars 14, the connectors 16 and the center fork 20 and the pinned connections 18, 22, between these four members create a "four bar linkage" that keeps the relative motion of each step pad 12 substantially vertical, wherein the flat upper surface of the step pad 12 remains horizontal.

Figure 3:
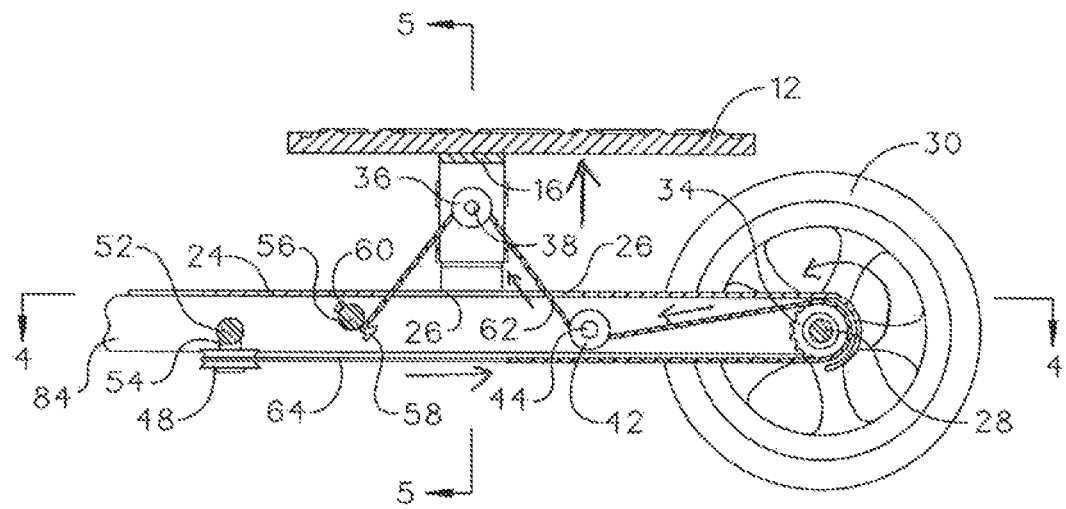
FIG. 3 is a sectional view taken along line 3-3 in FIG. 1.
Figure 4:
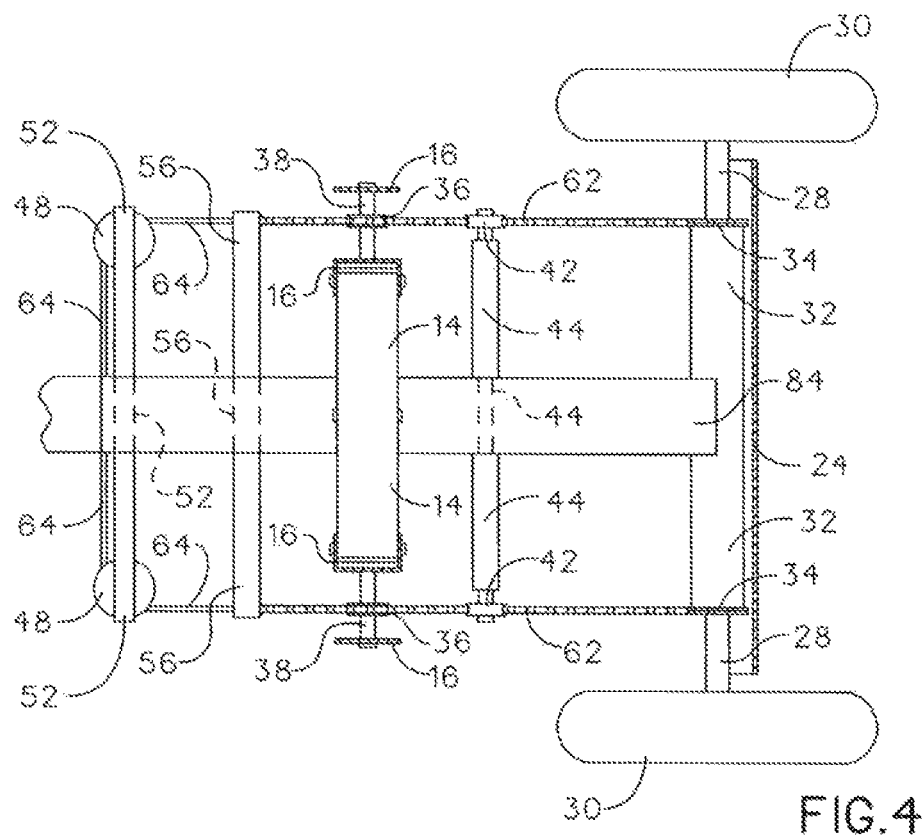
FIG. 4 is a sectional view taken along line 4-4 in FIG. 3.

In operation, when a first side step pad is depressed, the rocker bars 14 force the opposite, second side step pad to rise (FIG. 3). Rising of the second side step pad 12 causes the chain 62 on that side to be drawn beneath the guide wheel 42 and over the top of the sprocket 34 toward the guide wheel 42. This movement of the chain 62 over the sprocket 34 causes the drive wheel 30 to rotate forward (counterclockwise as shown in FIG. 3). Below the center guide wheel 36, the straight length of the chain 62 and cord 64 are drawn from the pulley 48 toward the sprocket 34.

On the other side of the scooter, the first step pad is lowered and the cord 64 pulls the lower straight run of chain 62 from the sprocket 34 toward the pulley 48 and takes up all slack in the chain caused by the lowering of the step pad 12. However, the sprocket 34 is a one-way transmission sprocket which causes the sprocket 34 to free wheel with respect to the drive wheel in the rear direction (clockwise in FIG. 3).

Thus, the back and forth oscillation of the chains 62 and the one direction transmission sprockets 34 cause the net effect to be a forward only propulsion of the scooter.

Figure 3A:
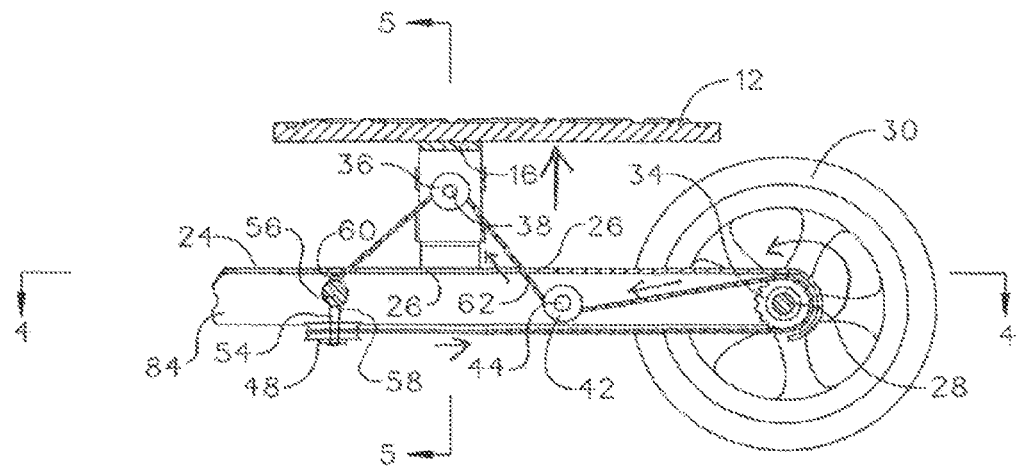
FIG. 3A is a sectional view of an alternate arrangement taken generally along line 3-3 of FIG. 1.
Figure 4A:
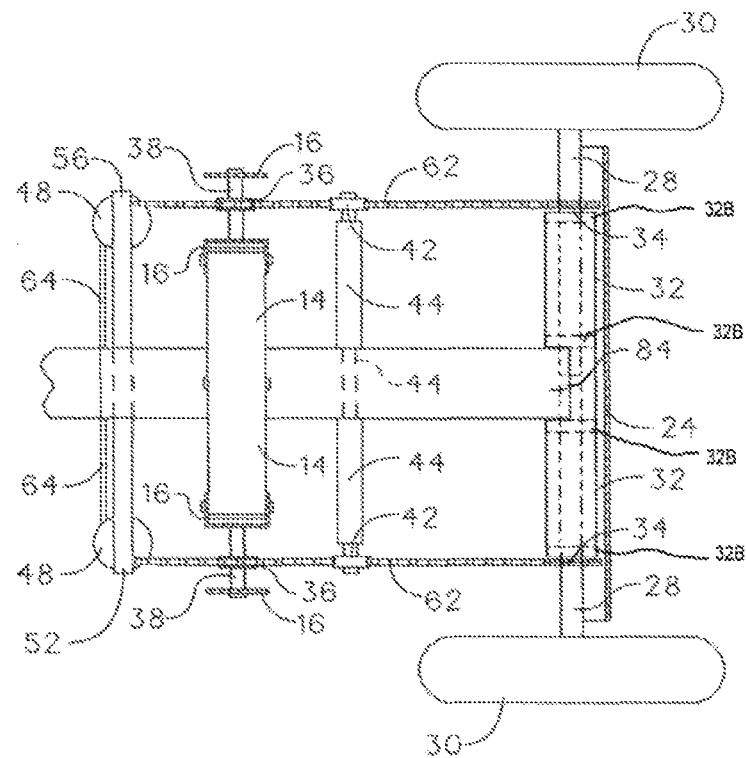
FIG. 4A is a sectional view of an alternate arrangement taken generally along line 4-4 in FIG. 3A.
Figure 5:
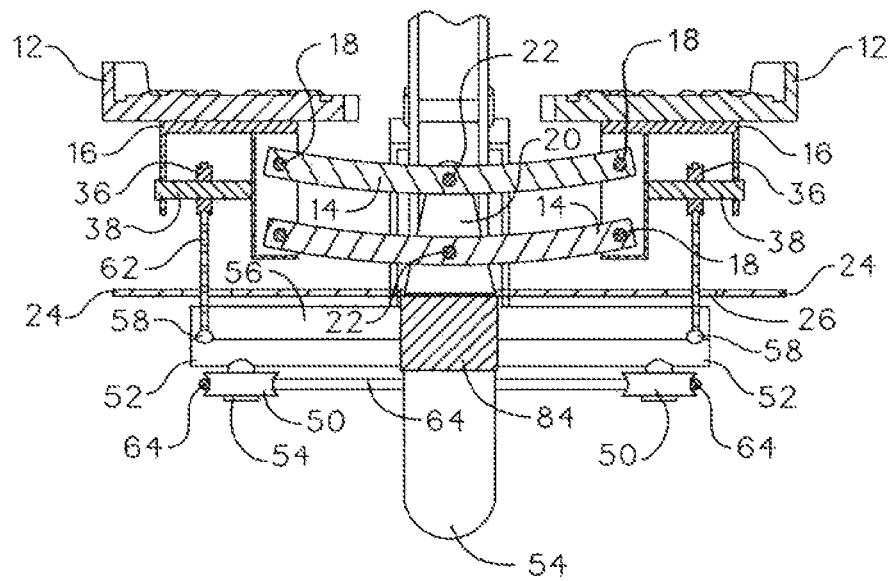
FIG. 5 is a sectional view taken along line 5-5 in FIG. 3.
Figure 6:
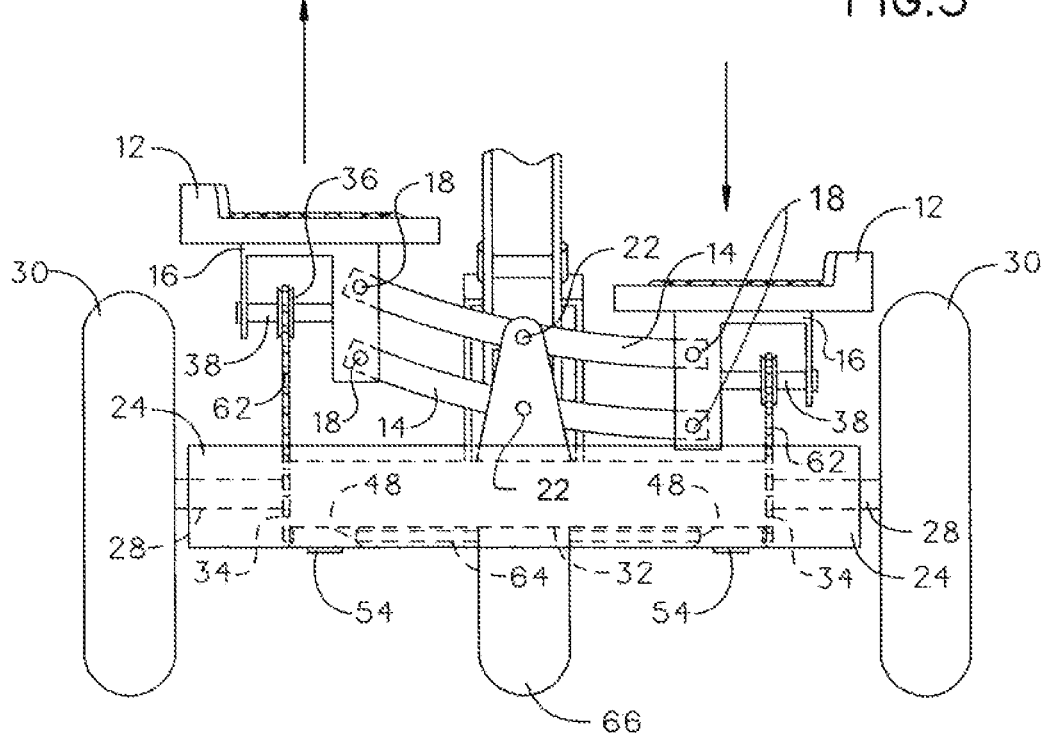
FIG. 6 is a rear view of the scooter of FIG. 1, illustrating the movement of the rocker bars.

FIGS. 3A and 4A illustrate a modification of the structure of FIGS. 2-6 in that the parts 52 and 56 have been combined in function, eliminating the part 52. Horizontal guide wheels 48 are carried on horizontal wheel posts 54 which now extend from the chain posts 56. Chain posts 56 receive chain bolts 58 which secure ends of the chains 62 to the posts 56 by chain bolt nuts 60. FIG. 4A also indicates that bearings 32B have been added to support the axle 28 within the sprocket tube 32.

Figure 7:
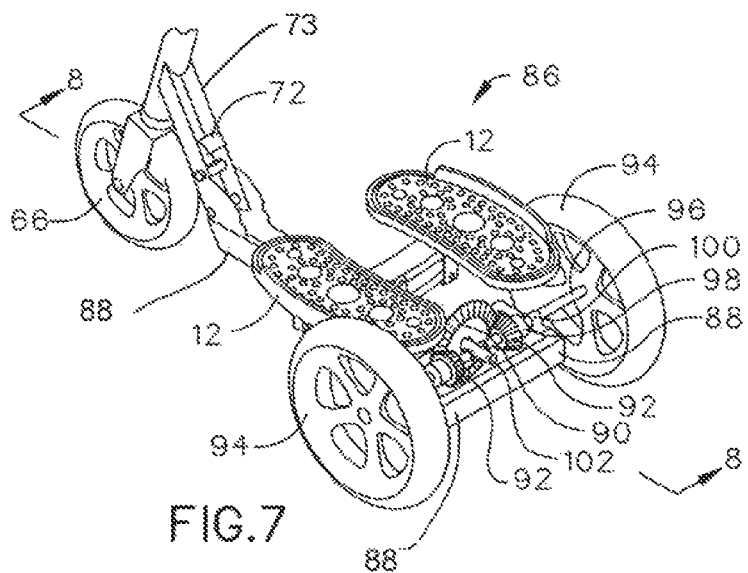
FIG. 7 is a perspective view of an alternate embodiment a scooter according to the invention.
Figure 8:
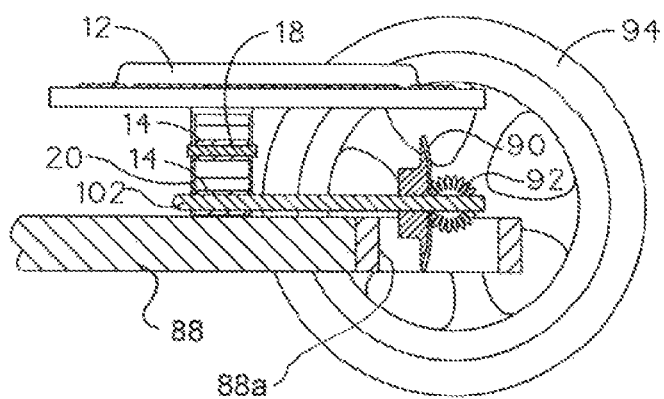
FIG. 8 is a sectional view taken along line 8-8 in FIG. 7.
Figure 9:
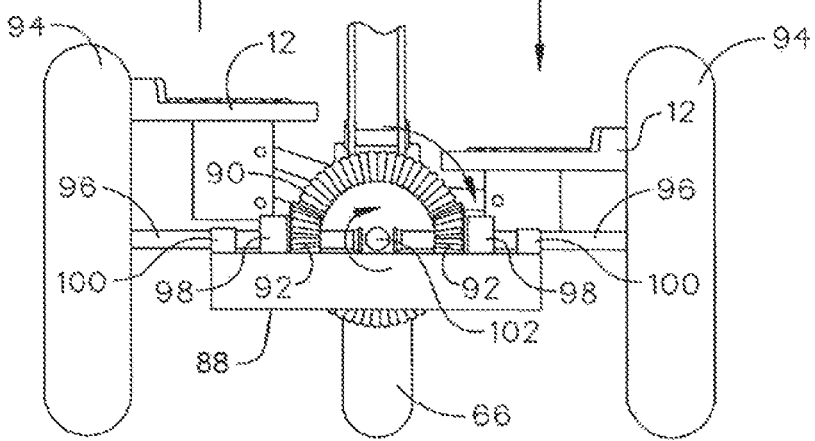
FIG. 9 is a rear view of scooter of FIG. 7, illustrating the movement of the rocker bars, large bevel gear, and bevel gear axle.

FIGS. 7-9 illustrate an alternate step-propelled scooter 86. Like elements carry the same reference numbers. In this embodiment, a large bevel gear 90 and two small bevel gears 92 are meshed to change the rotary axis of the bevel gear 90 degrees to drive alternate rear wheels 94. An alternate rear wheel axle 96 is journaled by one-way bearings 98 and axle guides 100 which are supported by a frame member 88. One-way bearings 98 are described for example in U.S. Pat. No. 7,581,742, or by analogy, the wheel hubs described in U.S. Pat. Nos. 4,593,799; 3,010,553; 3,709,341; 8,556,055, all herein incorporated by reference to the extent not inconsistent with the present disclosure. The frame member 88 would extend forward to connect to the angled frame member 73 as per the prior described embodiment. A bevel gear drive shaft 102 drives the large bevel gear. The drive shaft 102 is fixed to the bottom rocker arm 14, replacing the bottom axle 22 of the prior embodiment, such that rocking motion of the arms 14 causes the axle 102 to reciprocally rotate or rock. The frame member 88 includes an opening 88a to accommodate the large bevel gear 90.

Figure 10:
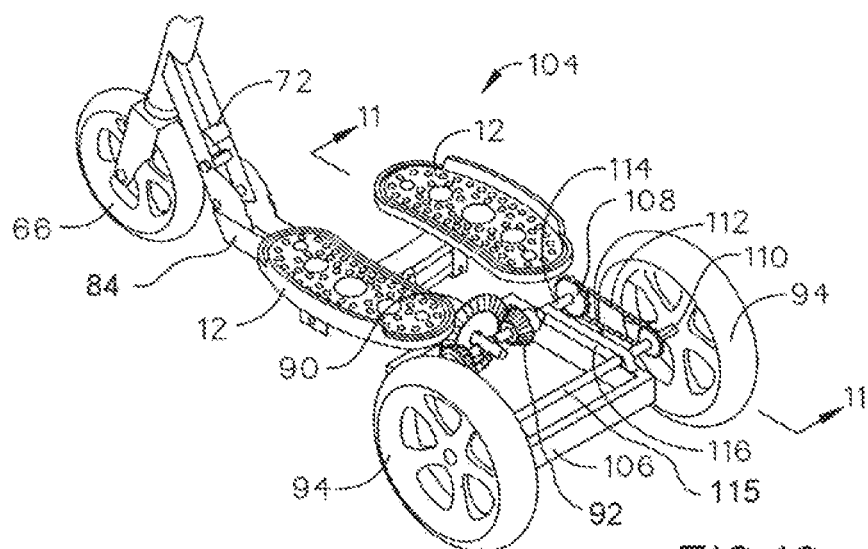
FIG. 10 is a perspective view of a further alternate embodiment a scooter according to the invention.
Figure 11:
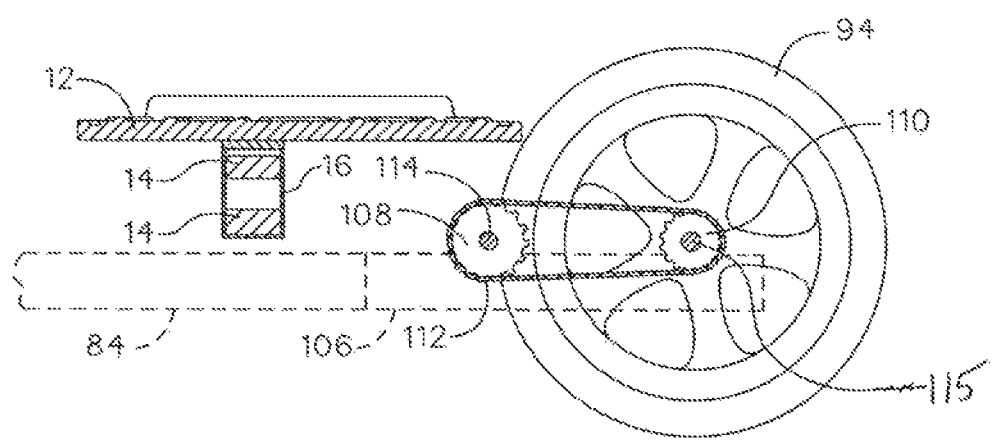
FIG. 11 is a sectional view taken along line 11-11 in FIG. 10.

FIGS. 10 and 11 illustrate a further alternate step-propelled scooter 104. A rear frame 106 supports a right side one-way sprocket 108 that is meshed with a right side driven sprocket 110 via a right side endless chain 112. The one-way sprocket 108 would have a hub for freewheeling and one direction propulsion the same as the prior described sprockets 34. A right side axle 114 is journaled by a right side axle guide 116 and is connected to the output of the right side bevel gear 92 and to the right side sprocket 108. The right side driven sprocket 110 is fixed to an axle 115 that is fixed to the wheels 94 to rotate the wheels for forward movement of the scooter. A left side arrangement (not shown) is provided in mirror image fashion to the right side arrangement. It includes a left side sprocket 108, a left side driven sprocket 110, a left side endless chain 112, a left side axle 114 and a left side axle guide 116. The left side axle is connected to an output of the left side bevel gear 92. The left side driven sprocket 110 is connected to the axle 115 that is fixed to the wheels 94 to rotate the wheels for forward movement of the scooter.

Figure 12:
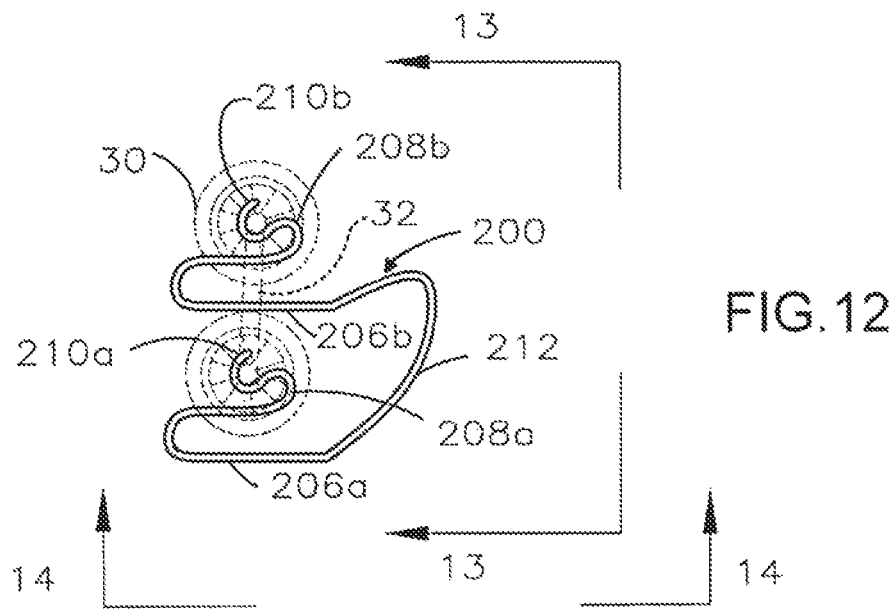
FIG. 12 is a perspective view of an accessory for the scooters of FIGS. 1-11.
Figure 13:
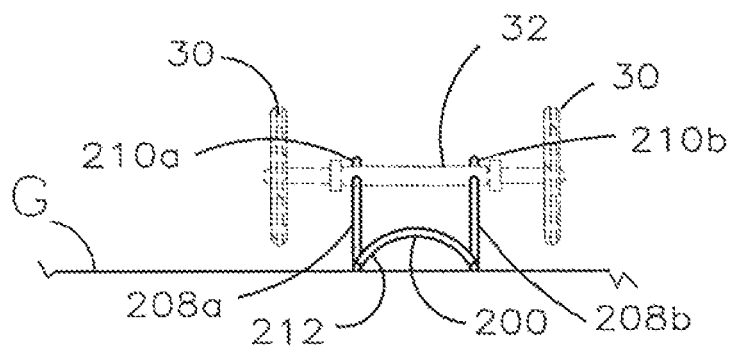
FIG. 13 is an end view of the accessory of FIG. 12 taken along line 13-13 of FIG. 12.
Figure 14:
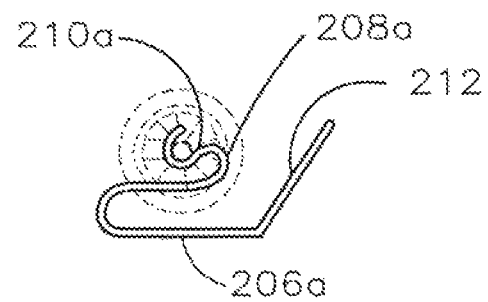
FIG. 14 is a side view of the accessory of FIG. 12 taken along line 14-14 of FIG. 12.

FIGS. 12-14 illustrate an accessory for use with any of the above scooter embodiments. A stand 200 for stationary use of the scooter lifts the wheels 30 of the scooter off the ground or floor G by supporting the sprocket tube 32 to render the scooter effectively immobile during use. In this instance the scooter can be used as a stationary exercise device. The stand 200 is advantageously formed of a bent metal tube. A bent ½ inch to 1 inch steel tube would probably be sufficient. The stand 200 includes linear floor-supported portions 206a, 206b, extending upward into respective serpentine portions 208a, 208b, extending forward into respective concave cradle portions 210a, 210b. A lateral inverted U-shaped brace portion 212 connects the rear of the floor-supported portions 206a, 206b. The serpentine portions 208a, 208b allow the floor-supported portions 206a, 206b to be located in front of, below, and behind the vertical load of the scooter exerted on the cradle portions 210a, 210b. This provides a more stable support base for the stand 200 to support the scooter. The cradle portions 210a, 210b are shaped to allow the sprocket tube 32 to be inserted in a forward direction and then move slightly downward to keep the sprocket tube 32 secure in the cradle portions, resisting rearward retraction and dislodgement From the foregoing, it will be observed that numerous variations and modifications may be effected without departing from the spirit and scope of the invention. It is to be understood that no limitation with respect to the specific apparatus illustrated herein is intended or should be inferred.

All references, including publications, patent applications, and patents, cited herein are hereby incorporated by reference to the same extent as if each reference were individually and specifically indicated to be incorporated by reference and were set forth in its entirety herein, to the extent that the references are not inconsistent with the present disclosure.

The invention claimed is:

1. A stepper scooter, comprising:
a frame;
at least one drive wheel rotatably mounted to the frame, the wheel having an associated drive sprocket, the drive sprocket configured to drive the wheel in a forward direction only and to free wheel in a reverse direction;
a laterally arranged rocker bar assembly pivotally connected to the frame, the rocker bar assembly having at least one rocker guide wheel;
at least one frame guide wheel rotatably connected to the frame;
step pads, configured for supporting the two feet of a user, are connected to the laterally arranged rocker bar assembly one at each lateral end of the rocker bar assembly, wherein alternating straight vertical movement of the step pads causes the rocker bar assembly to reciprocally pivot and the at least one rocker guide wheel to raise and lower in alternating fashion;
at least one drive chain having a first end fixed to the frame, and a second end held taught by the frame but movable, the drive chain being wrapped over the at least one rocker guide wheel, wrapped under the at least one frame guide wheel and wrapped over and around the at least one drive sprocket; and
wherein alternate raising and lowering of the at least one rocker guide wheel causes the at least one drive chain to circulate in opposite directions at the at least one drive sprocket, which causes rotation of the at least one drive wheel only in the forward direction; and
wherein the rocker bar assembly comprises two rocker bars that are spaced apart vertically substantially in parallel, a vertically-extending center member carried by the frame, and two step pad connectors which support the step pads, wherein the two rocker bars are operatively pivotally connected to the vertically-extending center member of the frame and at each end to a step pad connector, forming four bar linkages with the center member and each step pad connector.

2. The stepper scooter according to claim 1, comprising a pair of frame pulleys rotatably connected to the frame at opposite lateral sides of the frame;
an elongated flexible member;
wherein the at least one drive wheel comprises a pair of drive wheels spaced apart and rotatably mounted to the frame, each drive wheel having an associated drive sprocket, the associated drive sprockets configured to drive the drive wheels in a forward direction only and to free wheel with respect to the drive wheels when rotated in a reverse direction;
wherein the at least one rocker guide wheel comprises a pair of rocker guide wheels rotatably connected to each lateral end of the rocker bar assembly;
wherein the at least one frame guide wheel comprises a pair of frame guide wheels spaced apart and rotatably connected to the frame at opposite lateral sides of the frame;
wherein alternating vertical movement of the step pads causes the rocker bar assembly to reciprocally pivot and the rocker guide wheels to raise and lower in alternating fashion;

wherein the at least one drive chain comprises a pair of drive chains having first ends fixed to the frame, and second ends connected together by the elongated flexible member, the drive chains are each respectively wrapped over a rocker guide wheel, wrapped under a frame guide wheel and wrapped over and around a drive sprocket, with the elongated flexible member wrapped around the pair of frame pulleys; and
wherein alternate raising and lowering of the rocker guide wheels causes the drive chains to circulate in opposite directions around the drive sprockets, which causes rotation of the drive wheels only in the forward direction.

3. The stepper scooter according to claim 2, comprising a front wheel rotationally connected to the frame, wherein the drive wheels are mounted to a rear part of the frame, the frame supported by the front wheel and the two drive wheels.

4. A stepper scooter, comprising:
a frame:
at least one drive wheel rotatably mounted to the frame, the wheel having an associated drive sprocket, the drive sprocket configured to drive the wheel in a forward direction only and to free wheel in a reverse direction;
a laterally arranged rocker bar assembly pivotally connected to the frame, the rocker bar assembly having at least one rocker guide wheel;
at least one frame guide wheel rotatably connected to the frame;
step pads, configured for supporting the two feet of a user, are connected to the laterally arranged rocker bar assembly one at each lateral end of the rocker bar assembly, wherein alternating vertical movement of the step pads causes the rocker bar assembly to reciprocally pivot and the at least one rocker guide wheel to raise and lower in alternating fashion;
at least one drive chain having a first end fixed to the frame, and a second end held taught by the frame but movable, the drive chain being wrapped over the at least one rocker guide wheel, wrapped under the at least one frame guide wheel and wrapped over and around the at least one drive sprocket;
wherein alternate raising and lowering of the at least one rocker guide wheel causes the at least one drive chain to circulate in opposite directions at the at least one drive sprocket, which causes rotation of the at least one drive wheel only in the forward direction;
a pair of frame pulleys rotatably connected to the frame at opposite lateral sides of the frame;
an elongated flexible member;
wherein the at least one drive wheel comprises a pair of drive wheels spaced apart and rotatably mounted to the frame, each drive wheel having an associated drive sprocket, the associated drive sprockets configured to drive the drive wheels in a forward direction only and to free wheel with respect to the drive wheels when rotated in a reverse direction;
wherein the at least one rocker guide wheel comprises a pair of rocker guide wheels rotatably connected to each lateral end of the rocker bar assembly;
wherein the at least one frame guide wheel comprises a pair of frame guide wheels spaced apart and rotatably connected to the frame at opposite lateral sides of the frame;

wherein alternating vertical movement of the step pads causes the rocker bar assembly to reciprocally pivot and the rocker guide wheels to raise and lower in alternating fashion;

wherein the at least one drive chain comprises a pair of drive chains having first ends fixed to the frame, and second ends connected together by the elongated flexible member, the drive chains are each respectively wrapped over a rocker guide wheel, wrapped under a frame guide wheel and wrapped over and around a drive sprocket, with the elongated flexible member wrapped around the pair of frame pulleys; and wherein alternate raising and lowering of the rocker guide wheels causes the drive chains to circulate in opposite directions around the drive sprockets, which causes rotation of the drive wheels only in the forward direction;

wherein the rocker bar assembly comprises two rocker bars that are spaced apart vertically substantially in parallel, a vertically-extending center member carried by the frame, and two step pad connectors which support the step pads, wherein the two rocker bars are operatively pivotally connected to the vertically-extending center member of the frame and at each end to a step pad connector, forming four bar linkages with the center member and each step pad connector.

5. A stepper scooter, comprising:
a frame;
at least one drive wheel rotatably mounted to the frame, the at least one drive wheel driven by first and second drive sprockets, the drive sprockets configured to drive the at least one drive wheel in a forward direction only and to free wheel in a reverse direction;
first and second center guide wheels;
first and second drive chains each having a first end fixed to the frame, and seconds ends of the first and second drive chains being held taught by the frame but movable, the first and second drive chains being wrapped around the first and second drive sprockets and over the first and second center guide wheels;
step pads, configured for supporting the two feet of a user, are movably connected to the frame for straight vertical movement, the step pads arranged on opposite lateral sides of the frame, the first center guide wheel operatively connected to one step pad and the second center guide wheel operatively connected to the respective other step pad, wherein alternating straight vertical movement of the step pads causes the first and second center guide wheels to raise and lower in alternating fashion;
wherein alternating raising and lowering of the first and second center guide wheels causes the first and second drive chains to circulate in opposite directions at the first and second drive sprockets, which causes rotation of the at least one drive wheel only in the forward direction.

6. The stepper scooter according to claim 5, wherein the frame comprises first and second frame front guide wheels and the second ends of the first and second drive chains are operatively connected together and the first and second drive chains are operatively wrapped around the first and second frame front guide wheels.

7. The stepper scooter according to claim 6, wherein the second ends of the first and second drive chains are connected to a cord and the cord wraps around the first and second frame front guide wheels.

8. The stepper scooter according to claim 7, further comprising first and second frame rear guide wheels located on opposite sides of the frame, and the first frame rear guide wheel is located along the first drive chain between the first center guide wheel and the first drive sprocket, and the second frame rear guide wheel is located along the second drive chain between the second center guide wheel and the second drive sprocket.

9. The stepper scooter according to claim 8, comprising a laterally arranged rocker bar assembly pivotally connected to the frame, the rocker bar assembly carrying the first and second center guide wheels;
the step pads are connected to the laterally arranged rocker bar assembly one at each lateral end of the rocker bar assembly, wherein alternating vertical movement of the step pads causes the rocker bar assembly to reciprocally pivot and the first and second center guide wheels to raise and lower in alternating fashion;
wherein the rocker bar assembly comprises two rocker bars that are spaced apart vertically substantially in parallel, a vertically-extending center member carried by the frame, and two step pad connectors which support the step pads, wherein the two rocker bars are operatively pivotally connected to the vertically-extending center member of the frame and at each end to a step pad connector, forming four bar linkages with the center member and each step pad connector.

10. The stepper scooter according to claim 9, wherein the at least one drive wheel comprises a pair of drive wheels spaced apart and rotatably mounted to the frame, each drive wheel operatively connected to one of the first and second drive sprockets, the first and second drive sprockets configured to drive the associated drive wheel in a forward direction only and to free wheel with respect to the drive wheel when rotated in a reverse direction.

11. The stepper scooter according to claim 5, wherein the frame comprises a front guide and the second ends of the first and second drive chains are operatively connected together and the first and second drive chains are operatively guided for circulating movement by the front guide.

12. The stepper scooter according to claim 11, wherein the second ends of the first and second drive chains are operatively connected to a cord and the cord is guided for circulating movement by the front guide.

13. The stepper scooter according to claim 5, further comprising first and second frame rear guide wheels located on opposite sides of the frame, and the first frame rear guide wheel is located along the first drive chain between the first center guide wheel and the first drive sprocket, and the second frame rear guide wheel is located along the second drive chain between the second center guide wheel and the second drive sprocket.

14. The stepper scooter according to claim 5, comprising a laterally arranged rocker bar assembly pivotally connected to the frame, the rocker bar assembly carrying the first and second center guide wheels;
the step pads are connected to the laterally arranged rocker bar assembly one at each lateral end of the rocker bar assembly, wherein alternating vertical movement of the step pads causes the rocker bar assembly to reciprocally pivot and the first and second center guide wheels to raise and lower in alternating fashion;
wherein the rocker bar assembly comprises two rocker bars that are spaced apart vertically substantially in parallel, a vertically-extending center member carried by the frame, and two step pad connectors which support the step pads, wherein the two rocker bars are operatively pivotally connected to the vertically-extending center member of the frame and at each end to a step pad connector, forming four bar linkages with the center member and each step pad connector.

15. The stepper scooter according to claim 5, wherein the at least one drive wheel comprises a pair of drive wheels spaced apart and rotatably mounted to the frame, each drive wheel operatively connected to one of the first and second drive sprockets, the first and second drive sprockets configured to drive the associated drive wheel in a forward direction only and to free wheel with respect to the drive wheel when rotated in a reverse direction.

16. The stepper scooter according to claim 15, comprising a front wheel rotationally connected to the frame, wherein the drive wheels are mounted to a rear part of the frame, the frame supported by the front wheel and the two drive wheels.

* * * * *